United States Patent
Brailovskiy

(10) Patent No.: US 9,843,724 B1
(45) Date of Patent: Dec. 12, 2017

(54) STABILIZATION OF PANORAMIC VIDEO

(71) Applicant: Amazon Technologies, Inc., Seattle, WA (US)

(72) Inventor: Ilya Vladimirovich Brailovskiy, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 184 days.

(21) Appl. No.: 14/859,969

(22) Filed: Sep. 21, 2015

(51) Int. Cl.
| | |
|---|---|
| *H04N 5/232* | (2006.01) |
| *H04N 5/225* | (2006.01) |
| *H04N 5/247* | (2006.01) |
| *G06T 3/40* | (2006.01) |
| *H04N 5/262* | (2006.01) |
| *G06T 3/00* | (2006.01) |

(52) U.S. Cl.
CPC ....... *H04N 5/23238* (2013.01); *G06T 3/0062* (2013.01); *G06T 3/4038* (2013.01); *H04N 5/232* (2013.01); *H04N 5/23248* (2013.01); *H04N 5/23254* (2013.01); *H04N 5/23264* (2013.01); *H04N 5/2624* (2013.01); *H04N 5/2628* (2013.01)

(58) Field of Classification Search
CPC ......... G06T 11/00; G06T 17/00; G06T 19/00; G06T 15/20; G06T 15/30; H05K 5/0247; G11B 27/10; A63F 13/803; A63F 13/65; A63F 13/213; H04N 5/23238; H04N 5/23258; G03B 17/02; G03B 17/08; H01R 13/5219
See application file for complete search history.

(56) References Cited

U.S. PATENT DOCUMENTS

| | | | |
|---|---|---|---|
| 6,192,393 B1 | 2/2001 | Tarantino et al. | |
| 6,734,902 B1 * | 5/2004 | Kawahara | G03B 5/00 348/208.5 |
| 6,788,333 B1 | 9/2004 | Uyttendaele et al. | |
| 9,426,446 B2 * | 8/2016 | Kim | H04N 13/0296 |
| 9,438,800 B1 * | 9/2016 | Kozko | G06T 11/00 |

(Continued)

OTHER PUBLICATIONS

Bell et al., "A Non-Linear Filter for Gyroscope-Based Video Stabilization," European Conference on Computer Vision 2014, Available at: https://research.nvidia.com/publication/non-linear-filter-gyroscope-based-video-stabilization, 15 pages, (Sep. 2014).

*Primary Examiner* — Neil Mikeska

(74) *Attorney, Agent, or Firm* — K&L Gates LLP

(57) ABSTRACT

Various examples described herein are directed to systems and methods for stabilizing a panoramic video. The panoramic video may comprise a first frame captured by a panoramic camera. The panoramic camera may be positioned in a three-dimensional camera space described by an x-axis, a y-axis, and a z-axis that are mutually orthogonal. The first frame may comprise a plurality of pixel values arranged in a pixel plane and may be continuous in a first dimension. An image processor may receive from a motion sensor data describing a rotation of the panoramic camera at a time when the panoramic camera captured the first frame. The image processor may determine a planar component of an unintended rotation of the panoramic camera about the z-axis and convert the planar component of the unintended rotation to a first frame shift in the first dimension.

20 Claims, 12 Drawing Sheets

(56) References Cited

U.S. PATENT DOCUMENTS

| | | |
|---|---|---|
| 2002/0021353 A1 | 2/2002 | DeNies |
| 2002/0049979 A1 | 4/2002 | White et al. |
| 2004/0030527 A1 | 2/2004 | Rankin |
| 2004/0032495 A1 | 2/2004 | Ortiz |
| 2005/0002535 A1 | 1/2005 | Liu et al. |
| 2005/0280701 A1 | 12/2005 | Wardell |
| 2007/0035612 A1 | 2/2007 | Korneluk et al. |
| 2009/0160956 A1* | 6/2009 | Yumiki .................. G03B 5/00 348/208.11 |
| 2009/0284601 A1 | 11/2009 | Eledath et al. |
| 2010/0034425 A1 | 2/2010 | Lin et al. |
| 2010/0050221 A1 | 2/2010 | McCutchen et al. |
| 2010/0299630 A1 | 11/2010 | McCutchen et al. |
| 2011/0214072 A1 | 9/2011 | Lindemann et al. |
| 2012/0057852 A1 | 3/2012 | Devleeschouwer et al. |
| 2012/0210252 A1 | 8/2012 | Fedoseyeva et al. |
| 2013/0070047 A1 | 3/2013 | DiGiovanni et al. |
| 2014/0059166 A1 | 2/2014 | Mann et al. |
| 2015/0234156 A1* | 8/2015 | Rondinelli ............. G02B 13/06 359/857 |
| 2015/0262362 A1* | 9/2015 | Zaytsev ............... G06K 9/6202 382/103 |

\* cited by examiner

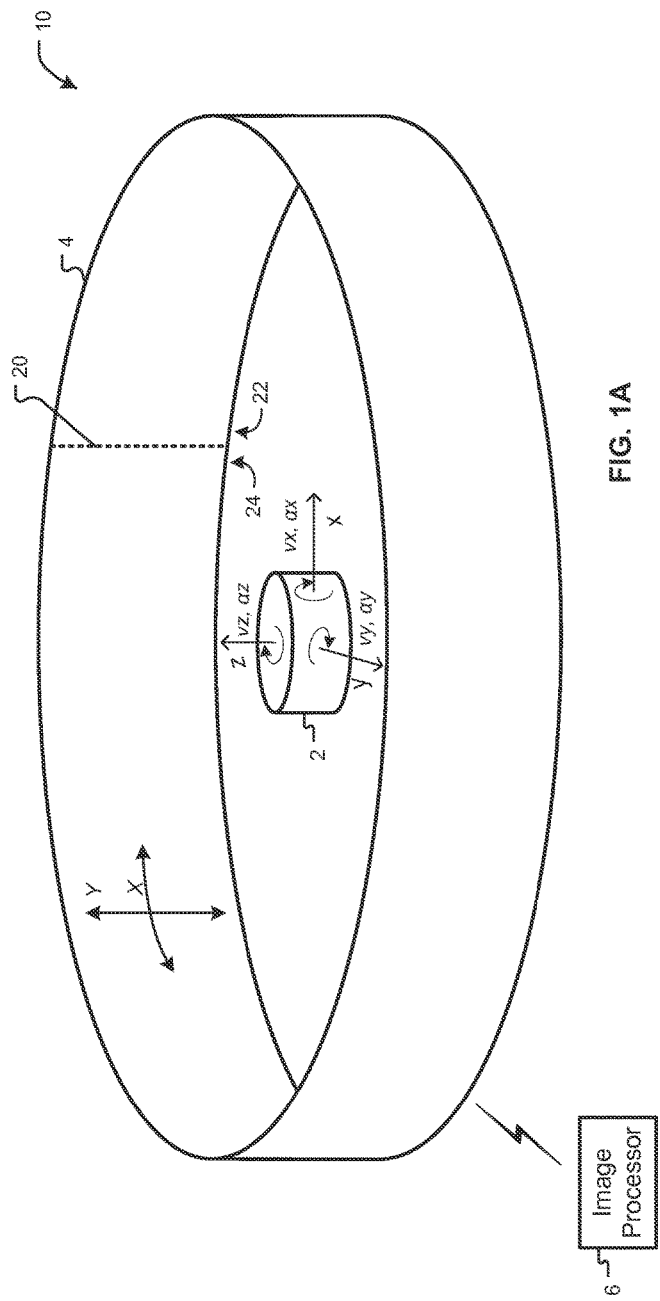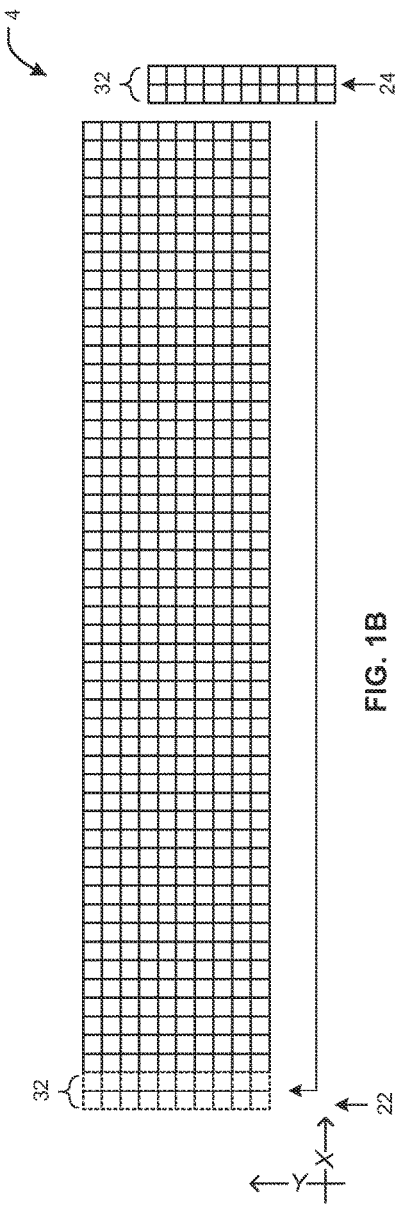
FIG. 1A
FIG. 1B

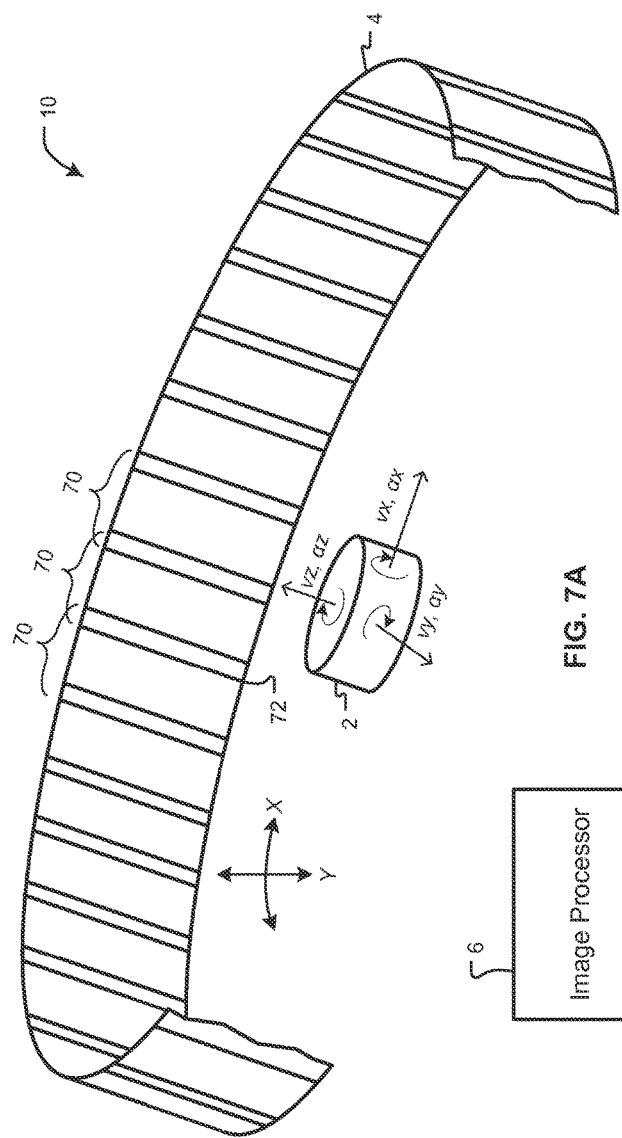
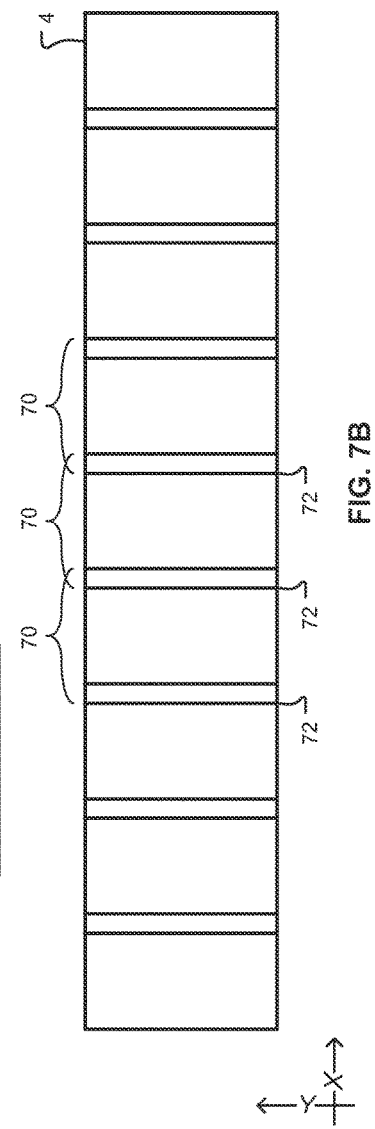
FIG. 7A
FIG. 7B

STABILIZATION OF PANORAMIC VIDEO

BACKGROUND

When a camera is not held still during video capture, hand shake and other motion-related artifacts can make the resulting video look jumpy and difficult to watch. Camera shake can sometimes be eliminated by using a tripod or other device that holds the camera still while video is captured. Often, however, it is not desirable or even practical to use these devices. The increasing popularity of smaller handheld video capture devices, such as mobile phones, has made the problem worse.

One approach for addressing camera shake is to apply a stabilization technique to video after it is captured. However, new forms of cameras introduce new technological challenges. Examples discussed herein provide technological solutions to these new challenges.

BRIEF DESCRIPTION OF DRAWINGS

FIG. 1A is a diagram showing one example of an environment for stabilizing panoramic video.

FIG. 1B is a diagram showing a flattened example of the frame illustrated in FIG. 1A.

FIG. 7A is a diagram showing one example of the environment of FIGS. 1A and 1B with the frame divided into sections.

FIG. 7B shows a flattened example of the frame of FIGS. 1A, 1B and 7A including sections.

DETAILED DESCRIPTION

Figure 2:
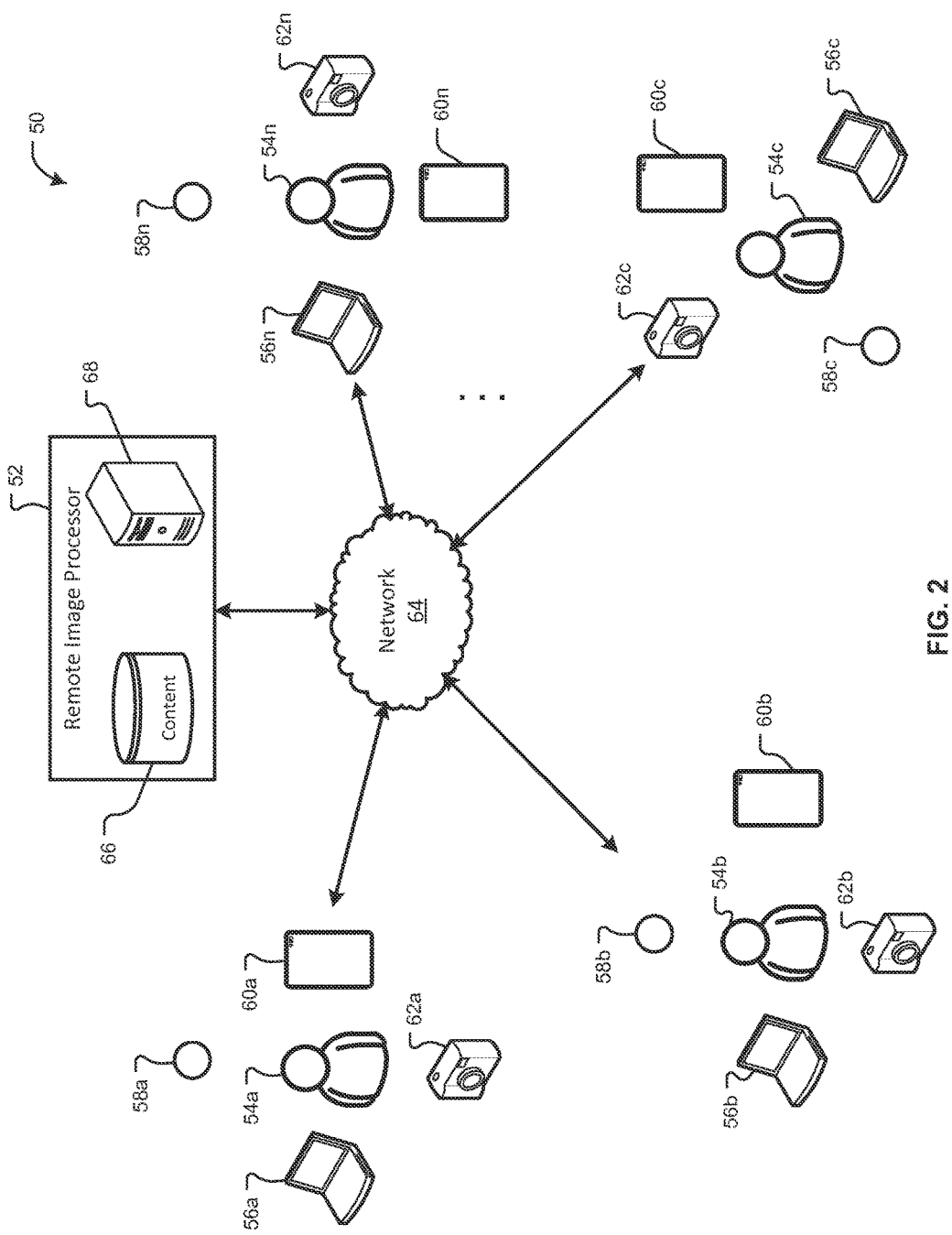
FIG. 2 is a diagram showing another example of an environment including various devices for capturing and stabilizing panoramic videos.

In the following description, reference is made to the accompanying drawings, which illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for stabilizing panoramic video by shifting frames from the panoramic video. FIG. 1A is a diagram showing one example of an environment 10 for stabilizing panoramic video. The environment 10 includes a panoramic camera 2 and an image processor 6. The panoramic camera 2 captures a frame 4. The frame 4, for example, may represent the three-dimensional camera space on a two-dimensional frame space. In FIG. 1A, the three-dimensional camera space is described by a Cartesian coordinate system having three mutually orthogonal axes, x, y, and z, although any suitable coordinate system may be used. The two-dimensional pixel plane is described by a Cartesian coordinate system having two orthogonal axes, X and Y although, again, any suitable coordinate system may be used.

The frame 4 may comprise a set of pixel values representing the scene captured by the panoramic camera 2. Spatial arrangement data for the frame 4 may describe a unique position for each pixel value of the frame 4 in the two-dimensional pixel plane (e.g., an X dimension position and a Y dimension position). The position of a pixel value on the pixel plane may correspond to the spatial position of a portion of the depicted scene represented by the pixel value. In some examples, each pixel value corresponds to the output from one pixel element of an image sensor of the panoramic camera 2. For example, when the panoramic camera 2 includes a single image sensor, a pixel value may represent the output of one pixel element from the image sensor. In other examples, pixel values may not directly correspond to the output of a single pixel element of an image sensor. For example, when the panoramic camera 2 includes multiple image sensors, some pixel values may represent a combination of outputs from pixel elements from different (e.g., adjacent) image sensors. Also, for example, when a frame is subject to various processing, such as compression, resolution modification, etc., pixel values may not directly correspond to the output of a single pixel element from an image sensor.

FIG. 1B is a diagram showing a flattened example of the frame 4. In the example of FIGS. 1A and 1B, pixel values of the frame 4 are continuous in the X direction. For example, pixel values at edges 22, 24 of the frame 4 depict adjacent portions of the camera space. This is illustrated in FIG. 1A, as the edges 22, 24 are adjacent to one another. Similarly, pixel values of the frame 4 are discontinuous in the Y direction. For example, pixel values at the top and bottom of the frame 4 do not do depict adjacent portions of the camera space.

In various examples, the image processor 6 may find an unintended motion of the camera, as described herein. For example, the unintended motion may be represented by a vector in the three-dimensional camera space. The image processor 6 may find a projection of the unintended motion of the camera onto the two-dimensional camera space of the frame 4. Projecting, or finding a projection, of a three-dimensional vector (e.g., in the camera space) onto a two-dimensional plane (e.g., the image space) may include finding components of the vector that fall within the two-dimensional plane. For components of the unintended motion projecting to the frame 4 in the direction in which the pixel values of the frame 4 are continuous (e.g., X in FIGS.

1A and 1B), the image processor 6 may find a frame shift. The frame shift may represent a distance in the continuous dimension (e.g., a number of pixel values) that the frame 4 is shifted because of unintended camera motion. The frame shift may be expressed in pixel value positions, which may refer to the number of positions on the pixel plane that each pixel value is shifted. The frame shift may be an integer number of pixel value positions or a fraction of a pixel value position (e.g., ½ of a pixel value position, ¼ of a pixel value position, etc.). When a non-integer shift is used, the image processor 6 may determine new pixel values using any suitable type of sub-pixel interpolation. In some examples, the image processor 6 may apply a finite impulse response (FIR) with any suitable number of taps (e.g., 6 taps) to the pixel values to determine the non-integer shift. In some examples, the image processor 6 may apply a bi-cubic and/or bi-linear interpolation. For example, the image processor 6 may take an average of four actual (e.g., pre-shift) pixel values around a post-shift pixel value position.

The frame shift may be applied to the frame 4 either before or during playback. To apply the frame shift, the image processor 6 (or other suitable device) may shift the value of each pixel value in the frame to the positive or negative X direction by an amount equal to the shift. One or more pixel columns that would be shifted off of the frame (e.g., pixel column 32) may be moved from one edge 24 of the frame 4 to the opposite edge 22. In the example shown in FIG. 1B, the frame shift is to the left or negative X direction. Accordingly, one or more pixel columns 32 are moved from the right edge 24 of the frame 4 to the left edge 22 of the frame 4. In some examples, depending on the motion of the panoramic camera 2, the frame shift may be in the opposite direction, which may call for one or more columns of pixel values to be moved from the left edge 22 of the frame 4 to the right edge 24 of the frame 4. As a result of the shift, unintended motion in the continuous dimension may be stabilized.

In some examples, the image processor 6 may be programmed to perform additional stabilization. For example, stabilization in the discontinuous dimension of the frame 4 (e.g., the Y direction) may be performed by cropping the frame 4, as described herein. In some examples, the frame 4 may be divided into sections in the Y direction, with cropping being performed differently for each section. (See FIGS. 6-7). Also, for example, some unintended motion of the panoramic camera 2 may be more apparent in foreground objects closer to the panoramic camera 2 than in background objects that are farther from the camera. The image processor 6 may be programmed to identify objects in the frame 4 and determine whether objects are in the foreground or the background. Objects in the foreground (e.g., sets of pixel values making up the objects) may be shifted and/or re-sized in the frame 4 to correct for the unintended motion. In some examples, shifting or re-sizing an object leaves blank pixel values. Blank pixel values may be populated from corresponding pixel values in adjacent frames of a video.

Video stabilizing, as described herein, may be performed utilizing any suitable device or devices. For example, the image processor 6 may be implemented by any suitable device. In some examples, the panoramic camera, such as the panoramic camera 2, may comprise an internal image processor that performs stabilization and provides stabilized videos for playback. Also, in some examples, the image processor may be external to the camera and may be implemented, for example, by another local device and/or at a remote location. FIG. 2 is a diagram showing another example of an environment 50 including various devices for capturing and stabilizing panoramic videos. The environment 50 comprises a remote image processor 52 and users 54a, 54b, 54c, 54n. Each user 54a, 54b, 54c, 54n may use one or more user devices such as, for example, panoramic cameras 58a, 58b, 58c, 58n, digital cameras 62a, 62b, 62c, 62n, mobile devices 60a, 60b, 60c, 60n, or other computing devices 56a, 56b, 56c, 56n. Although four users 54a, 54b, 54c, 54n are shown, any suitable number of users 54a, 54b, 54c, 54n may be part of the environment. Also, although each user 54a, 54b, 54c, 54n shown in FIG. 2 is associated with a panoramic camera 58a, 58b, 58c, 58n, a mobile device 60a, 60b, 60c, 60n, a digital camera 62a, 62b, 62c, 62n and a computing device 56a, 56b, 56c, 56n, some users 54a, 54b, 54c, 54n may use additional user devices and/or fewer user devices than what is shown.

User devices may be utilized to capture videos, transmit videos to the remote image processor 52, and/or perform video stabilization as described herein. Panoramic cameras 58a, 58b, 58c, 58n may include one or more image sensors and associated optics to capture panoramic images and/or panoramic videos. Panoramic cameras 58a, 58b, 58c, 58n may have a panoramic field-of-view larger than that of a standard camera. For example, panoramic cameras 58a, 58b, 58c, 58n may have a field-of-view of about 180° or greater. Some panoramic cameras 58a, 58b, 58c, 58n may have fields-of-view as large as 360° and/or 4n steradians. In some examples, a panoramic camera 58a, 58b, 58c, 58n may comprise a single image sensor with lenses, mirrors or other optics allowing the single image sensor to receive electromagnetic radiation (e.g., light) from the panaromic field-of-view. In some examples, a panoramic camera 58a, 58b, 58c, 58n may comprise multiple image sensors (e.g., with overlapping fields-of-view). The panoramic camera 58a, 58b, 58c, 58n (or another component of the environment 50) may be configured to stitch frames from the respective image sensors into a single panoramic frame. In some examples, a panoramic camera 58a, 58b, 58c, 58n may be configured to communicate with other components of the environment 50 utilizing, for example, a wired or wireless connection. For example, a panoramic camera 58a, 58b, 58c, 58n may upload a frame or frames to a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a panoramic camera 58a, 58b, 58c, 58n may be configured to upload video directly to a remote image processor 52, for example, via the network 64. Also, in some examples, a panoramic camera 58a, 58b, 58c, 58n may comprise a processor and/or other components to implement an image processor (e.g., for de-blurring, as described herein).

Digital cameras 62a, 62b, 62c, 62n may comprise any suitable device with one or more image sensors to capture an image and/or video. In some examples, digital cameras 62a, 62b, 62c, 62n may be configured to communicate with other components of the environment 50 utilizing, for example, a wired or wireless connection. For example, a digital camera 62a, 62b, 62c, 62n may upload images and/or videos to a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a digital camera 62a, 62b, 62c, 62n may be configured to upload images and/or video directly to a remote image processor 52, for example, via the network 64. Also, in some examples, a digital camera 62a, 62b, 62c, 62n may comprise a processor and/or other components to implement video stabilization, as described herein. Digital cameras 62*a*, 62*b*, 62*c*, 62*n* may have a standard or panoramic field-of-view. For example, some aspects of video stabilization described herein performed on videos having a standard or panoramic field-of-view.

A mobile device 60*a*, 60*b*, 60*c*, 60*n* may be any suitable type of computing device comprising a processor and data storage. In some examples, a mobile device 60*a*, 60*b*, 60*c*, 60*n* may be configured to receive video captured by a panoramic camera 58*a*, 58*b*, 58*c*, 58*n* or digital camera 62*a*, 62*b*, 62*c*, 62*n* and transfer the video for stabilization at the remote image processor 52. In some examples, a mobile device 60*a*, 60*b*, 60*c*, 60*n* may execute an image processor for stabilizing videos received, for example, from a panoramic camera 58*a*, 58*b*, 58*c*, 58*n* or digital camera 62*a*, 62*b*, 62*c*, 62*n*. Also, in some examples, a mobile device 60*a*, 60*b*, 60*c*, 60*n* may comprise one or more image sensors and associated optics for capturing video and either uploading the video to the remote image processor 52 or performing stabilization, described herein. In some examples, a mobile device 60*a*, 60*b*, 60*c*, 60*n* may be configured to communicate on a cellular or other telephone network in addition or instead of the network 64.

A computing device 56*a*, 56*b*, 56*c*, 56*n* may be any suitable type of computing device comprising a processor and data storage including, for example, a laptop computer, a desktop computer, etc. In some examples, a computing device 56*a*, 56*b*, 56*c*, 56*n* may be configured to receive videos captured by a panoramic camera 58*a*, 58*b*, 58*c*, 58*n* or digital camera 62*a*, 62*b*, 62*c*, 62*n* and transfer the videos for stabilization at the remote image processor 52. In some examples, a computing device 56*a*, 56*b*, 56*c*, 56*n* may be configured to execute an image processor for stabilizing videos received, for example, from a panoramic camera 58*a*, 58*b*, 58*c*, 58*n* or digital camera 62*a*, 62*b*, 62*c*, 62*n*. Also, in some examples, a computing device 56*a*, 56*b*, 56*c*, 56*n* may comprise one or more image sensors and associated optics for capturing video and either uploading the video to the remote image processor 52 or performing stabilization locally.

The optional remote image processor 52 may perform video stabilization on videos received from users 54*a*, 54*b*, 54*c*, 54*n* (e.g., user devices associated with the user). The remote image processor 52 may comprise one or more data stores 66 and one or more servers 68. The data store 66 may store videos received from the various user devices, motion kernels, and/or other data associated with de-blurring. The various components 68, 66 of the remote image processor 52 may be at a common geographic location and/or may be distributed across multiple geographic locations. For example, the remote image processor 52 may be implemented in whole or in part as a cloud or Sofare as a Service (SaaS) system. In some examples, the remote image processor 52 may perform video stabilization on videos received from multiple different users 54*a*, 54*b*, 54*c*, 54*n* (e.g., via their associated cameras, computing devices, or other devices). The various components of the environment 50 may be in communication with one another via a network 64. The network 64 may be and/or comprise any suitable wired or wireless network configured according to any suitable architecture or protocol. In some examples, the network 64 may comprise the Internet.

Figure 3:
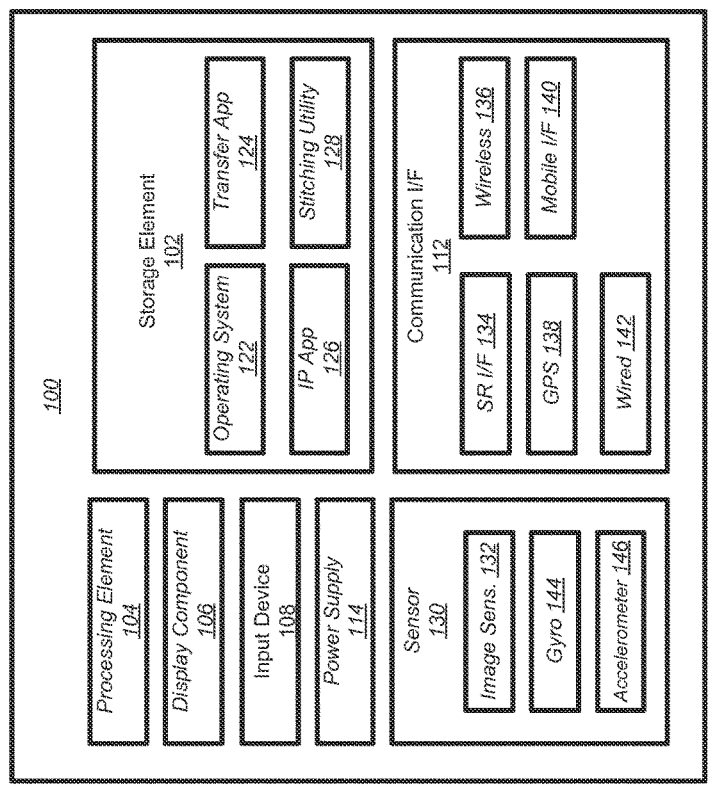
FIG. 3 is a block diagram showing an example architecture of a user device, such as the panoramic cameras, digital cameras, mobile devices and other computing devices described herein.

FIG. 3 is a block diagram showing an example architecture 100 of a user device, such as the panoramic cameras, digital cameras, mobile devices and other computing devices described herein. It will be appreciated that not all user devices will include all of the components of the architecture 100 and some user devices may include additional components not shown in the architecture 100. The architecture 100 may include one or more processing elements 104 for executing instructions and retrieving data stored in a storage element 102. The processing element 104 may comprise at least one processor. Any suitable processor or processors may be used. For example, the processing element 104 may comprise one or more digital signal processors (DSPs). The storage element 102 can include one or more different types of memory, data storage or computer readable storage media devoted to different purposes within the architecture 100. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc.

The storage element 102 may also store software for execution by the processing element 104. An operating system 122 may provide the user with an interface for operating the user device and may facilitate communications and commands between applications executing on the architecture 100 and various hardware thereof. A transfer application 124 may be configured to receive video from another device (e.g., a panoramic camera or digital camera) or from an image sensor 132 included in the architecture 100. In some examples, the transfer application 124 may also be configured to upload the received videos to another device that may perform stabilization as described herein (e.g., a mobile device, another computing device, or a remote image processor 52). In some examples, a image processor application 126 may perform stabilization on videos received from an image sensor of the architecture 100 and/or from another device. The image processor application 126 may be included, for example, at a panoramic camera, a digital camera, a mobile device or another computer system. In some examples, where stabilization is performed by a remote image processor 52 or another component of the environment 50, the image processor application 126 may be omitted. A stitching utility 128 may stitch videos received from multiple image sensors into a single image and/or video. The stitching utility 128 may be included, for example, in a panoramic camera and/or a mobile device or other computing device receiving input from a panoramic camera.

When implemented in some user devices, the architecture 100 may also comprise a display component 106. The display component 106 may comprise one or more light emitting diodes (LEDs) or other suitable display lamps. Also, in some examples, the display component 106 may comprise, for example, one or more devices such as cathode ray tubes (CRTs), liquid crystal display (LCD) screens, gas plasma-based flat panel displays, LCD projectors, or other types of display devices, etc.

The architecture 100 may also include one or more input devices 108 operable to receive inputs from a user. The input devices 108 can include, for example, a push button, touch pad, touch screen, wheel, joystick, keyboard, mouse, trackball, keypad, light gun, game controller, or any other such device or element whereby a user can provide inputs to the architecture 100. These input devices 108 may be incorporated into the architecture 100 or operably coupled to the architecture 100 via wired or wireless interface. When the display component 106 includes a touch sensitive display, the input devices 108 can include a touch sensor that operates in conjunction with the display component 106 to permit users to interact with the image displayed by the display component 106 using touch inputs (e.g., with a finger or stylus). The architecture 100 may also include a power supply 114, such as a wired alternating current (AC) converter, a rechargeable battery operable to be recharged through conventional plug-in approaches, or through other approaches such as capacitive or inductive charging.

The architecture 100 may also include a communication interface 112, comprising one or more wired or wireless components operable to communicate with one or more other user devices and/or with the remote image processor 52. For example, the communication interface 112 may comprise a wireless communication module 136 configured to communicate on a network, such as the network 64, according to any suitable wireless protocol, such as IEEE 802.11 or another suitable wireless local area network WLAN protocol. A short range interface 134 may be configured to communicate using one or more short range wireless protocols such as, for example, near field communications (NFC), Bluetooth™, Bluetooth LE™, etc. A mobile interface 140 may be configured to communicate utilizing a cellular or other mobile protocol. A Global Positioning System (GPS) module 138 may be in communication with one or more earth-orbiting satellites or other suitable position-determining systems to identify a position of the architecture 100. A wired communication module 142 may be configured to communicate according to the Universal Serial Bus (USB) protocol or any other suitable protocol.

The architecture 100 may also include one or more sensors 130 such as, for example, one or more image sensors and one or more motion sensors. An image sensor 132 is shown in FIG. 3. Some examples of the architecture 100 may include multiple image sensors 132. For example, a panoramic camera may comprise multiple image sensors 132 resulting in multiple video frames that may be stitched to form a panoramic output. Motion sensors may include any sensors that sense motion of the architecture including, for example, gyro sensors 144 and accelerometers 146. Motion sensors, in some examples, may be included in user devices such as panoramic cameras, digital cameras, mobile devices, etc., that capture video to be stabilized. The gyro sensor 144 may be configured to generate data indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 146 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 138 may be utilized as a motion sensor. For example, changes in the position of the architecture 100, as determined by the GPS interface 138, may indicate the motion of the GPS interface 138.

Figure 4:
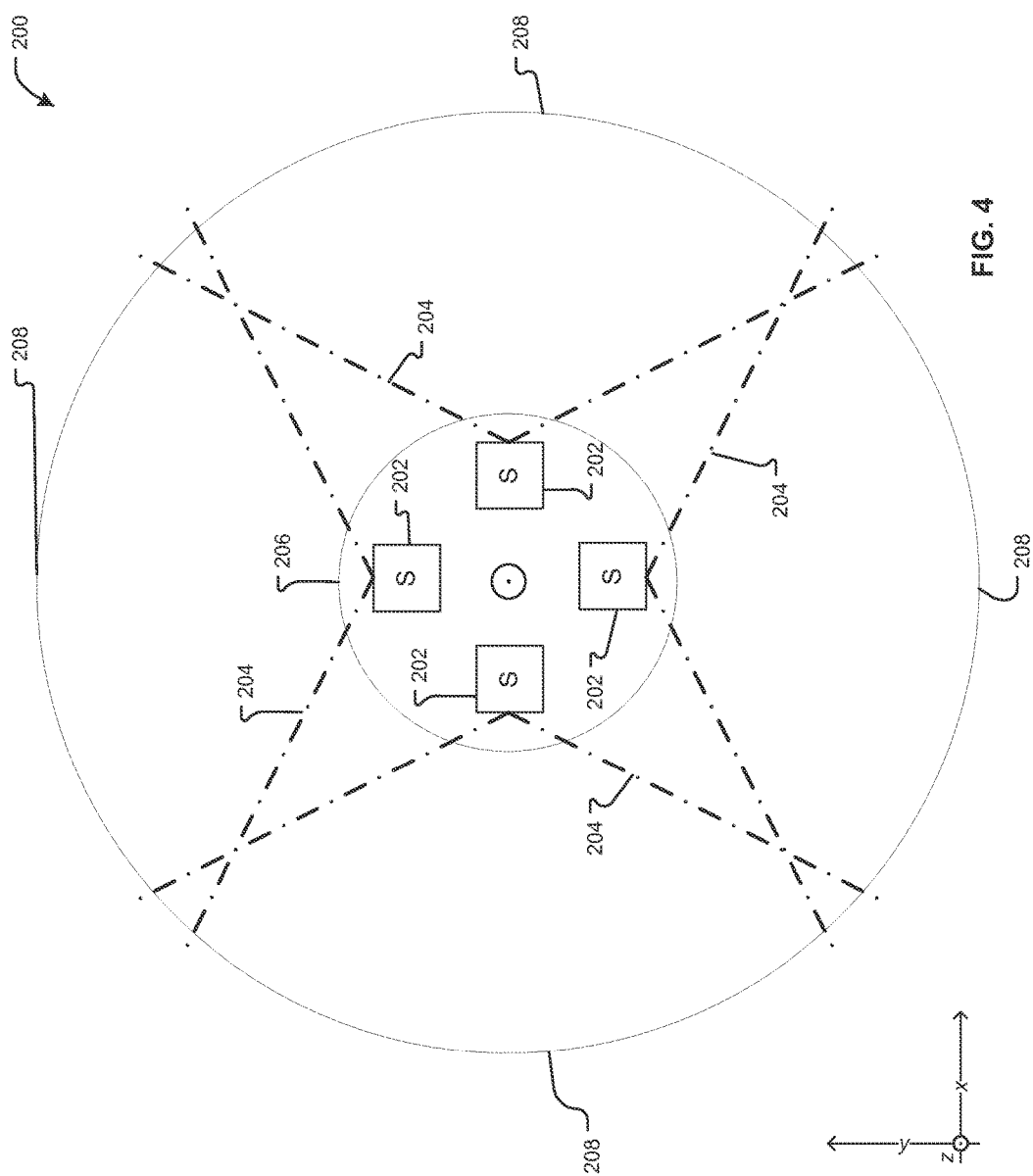
FIG. 4 is a diagram showing a cross-sectional view of one example of a panoramic camera comprising four image sensors positioned at a plane of the x and y axes of the camera space.

FIG. 4 is a diagram showing a cross-sectional view of one example of a panoramic camera 200 comprising four image sensors 202 positioned at a plane of the x and y axes of the camera space. The image sensors 202 may be mounted in a mounting assembly 206 in any suitable manner. The image sensors 202 may be or include any suitable type of sensor including, for example, charge coupled devices. Image sensors 202 may also include lenses, mirrors or other suitable optics. Each image sensor 202 may have a field of view indicated by 204. The fields-of-view 204 may overlap, as shown. Frames 208 captured by the various image sensors 202 may be stitched into a panoramic frame, similar to the panoramic frame 4. For example, collectively, the image sensors 202 may have a 360° field-of-view. In some examples, the panoramic camera 200 may comprise more or fewer image sensors either directed on the xy plane like the image sensors 202 or in another position. For example, the panoramic camera 200 may comprise one or more image sensors directed in the positive and/or negative z direction. The field-of-view of such an example of the panoramic camera 200 may be as much as $4n$ steradians.

Figure 5:
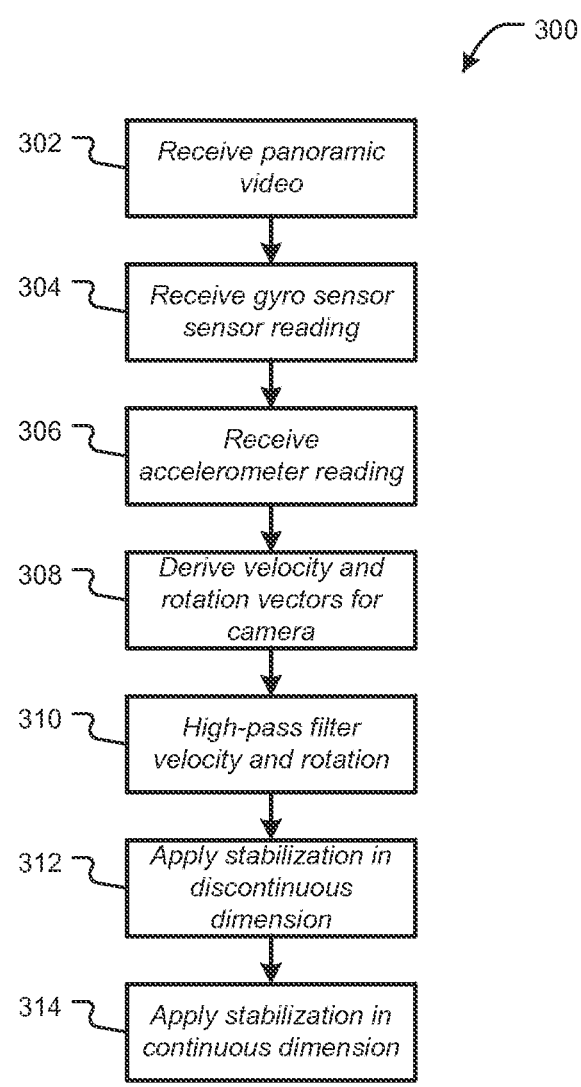
FIG. 5 is a flow chart showing one example of a process flow that may be executed by an image processor to stabilize a panoramic video.

FIG. 5 is a flow chart showing one example of a process flow 300 that may be executed by an image processor to stabilize a panoramic video. At 302, the image processor may receive a panoramic video. The panoramic video may comprise a plurality of panoramic frames. Similar to the frame 4, each of the panoramic frames may comprise pixel values arranged according to the two-dimensional frame space or grid. Pixel values of the frames may be continuous in one dimension and discontinuous in the other dimension. For example, referring to FIGS. 1A and 1B, pixel values of the frame 4 are continuous in the X dimension and discontinuous in the Y dimension. At 304, the image processor may receive a gyro sensor reading. The gyro sensor reading may include rotation data describing a rotation of the camera that captured the panoramic video received at 302. The gyro sensor reading may be received directly from the gyro sensor, for example, if the image processor is being implemented at the same camera or other user device that captured the panoramic video. Also, in some examples, the gyro sensor reading may be received indirectly from the camera or other user device that captured the panoramic video. In some examples, the gyro sensor reading may be taken over the time during which the panoramic video was captured. For example, the rotation of the camera may take different values at different times during the capture of the video, resulting in an indication of camera rotation versus time. At 306, the image processor may receive an accelerometer reading. The accelerometer reading may describe a velocity of the camera that captured the panoramic video. The accelerometer reading may be received directly from the accelerometer, for example, if the image processor is being implemented at the same user device that captured the panoramic video. Also, in some examples, the accelerometer reading may be received indirectly from the camera or other user device that captured the panoramic video. In some examples, the accelerometer reading may be taken over the time during which the panoramic video was captured. For example, the velocity of the camera may take different values at different times during the capture of the video, resulting in an indication of camera velocity versus time. In some examples, the image processor may derive camera rotation and velocity from raw sensor signals.

In some examples, the gyro sensor reading of 304 and/or the accelerometer reading of 306 may be omitted. For example, the image processor may be configured to stabilize video, as described herein, based on whatever motion sensor data is available. If no motion sensor data is available, the image processor may be programmed to extract motion data from the frames of the video itself utilizing any suitable method. Upon receiving the gyro sensor reading and/or the accelerometer reading, the image processor may derive velocity and/or rotation vectors describing the motion of the camera in the camera space. Equations [1] and [2] below show example velocity (v) and rotation (α) vectors expressed according to the Cartesian coordinate system illustrated in FIGS. 1A and 1B:

$$v=(v_x,v_y,v_z) \quad [1]$$

$$\alpha=(\alpha_x,\alpha_y,\alpha_z) \quad [2]$$

These vectors are also illustrated in FIG. 1A. In some examples, the vectors v, a may be expressed as a function of time.

In various examples, the velocity vector (v) and rotation vector (a) include both intended camera motion and unintended camera motion. Intended motion may include, for example, when a user pans the camera, when video is taken from a moving car, etc. Unintended motion may include, for example, hand shake and other motion to be removed from the video during stabilization. Accordingly, the motion and rotation vectors may be expressed as indicated by Equations [3] and [4] below:

$$v=(v_{cx},v_{cy},v_{cz})+(v_{ux},v_{uy},v_{uz}) \quad [3]$$

$$\alpha=(\alpha_{cx},\alpha_{cy},\alpha_{cz})+(\alpha_{ux},\alpha_{uy},\alpha_{uz}) \quad [4]$$

In equations [3] and [4], components with the subscript c indicate motion intended motion while components with the subscript u indicate unintended motion. At 310, the image processor may separate intended from unintended motion by applying a high-pass filter to the velocity and rotation vectors. The high-pass filter may be applied to the velocity and rotation vectors individually and/or simultaneously. The result may be an unintended velocity vector $v_u$ and an unintended rotation vector $\alpha_u$. The unintended velocity and rotation may represent high-frequency motion and rotation, for example, due to hand shake and similar camera artifacts. Lower-frequency motion attenuated by the high-pass filter may include attention velocity and rotation, for example, due to camera motion such as panning. Because the lower-frequency, intended motion is attenuated by the high-pass filter, it may remain in the video. The high-pass filter may be configured with any suitable cut-off frequency. In some examples, the cut-off frequency may be approximately 50 Hz. For example, motion with a frequency above 50 Hz may be considered unintentional while motion with a frequency below 50 Hz may be considered intentional. In some example, the image processor may set the cut-off frequency of the high-pass filter based on the sensed motion of the panoramic camera. For example, if the camera velocity has a high speed component indicating that the panoramic camera is on a car or other vehicle, the cut-off frequency may be raised (e.g., to approximately 100 Hz). Although approximately 50 Hz and approximately 100 Hz are provided as example cut-off frequencies for the high-pass filter, any suitable frequency may be used including, for example, any frequency from approximately 10 Hz to approximately 200 Hz.

At 312, the image processor may utilize the unintended velocity and/or rotation vectors to apply stabilization to the panoramic video in the discontinuous dimension. In the example of FIGS. 1A and 1B, this is the vertical or Y dimension. Examples demonstrating how to apply stabilization to the discontinuous dimension are provided herein, for example, with respect to FIGS. 6 and 7. At 314, the image processor may also utilize the unintended velocity and/or rotation vectors to apply stabilization to the panoramic video in the continuous dimension. In the example of FIGS. 1A and 1B, this is the horizontal or X dimension. Examples demonstrating how to apply stabilization in the X dimension are provided herein, for example, with respect to FIGS. 8, 9 and 10. In various examples, stabilization in the discontinuous dimension (312) and continuous dimension (314) may be performed frame-by-frame. For example, the image processor may perform the stabilization described at 312 and 314 for an individual frame by finding an unintended velocity vector $v_u$ and an unintended rotation vector $\alpha_u$ at a time when the frame was captured. These may be used to stabilize the frame, for example, as described herein. The image processor may stabilize as many or as few frames from a panoramic video as desired. In some examples, the image processor may stabilize all of the frames in a panoramic video. The result of frame-by-frame stabilization may be a stabilized video that can be played-back to a user (e.g., on a user device comprising a display). In all of the process flows described herein, including the process flow 300, the various actions may be performed in any suitable order and/or in parallel. In some examples of the process flow 300, stabilization may be applied in the continuous dimension and discontinuous dimension in any suitable order and/or in parallel.

Figure 6:
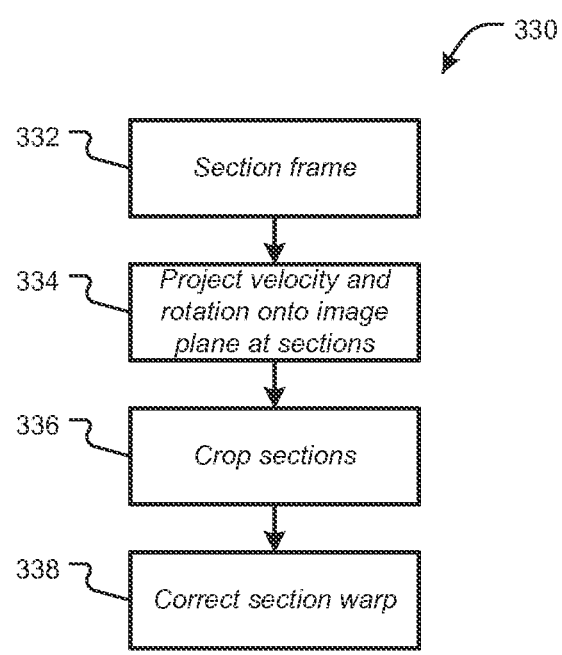
FIG. 6 is a flow chart showing one example of a process flow that may be executed by an image processor to stabilize a panoramic video in a discontinuous dimension.

FIG. 6 is a flow chart showing one example of a process flow 330 that may be executed by an image processor to stabilize a panoramic video in a discontinuous dimension. FIG. 6 is described with reference to FIGS. 1A and 1B as well as FIGS. 7A and 7B, introduced below. In these figures, the vertical frame space dimension Y is discontinuous and the horizontal frame space dimension X is continuous. In various examples, however, the process flow 330 can be used with any panoramic video that is discontinuous in a first dimension. The process flow 330 demonstrates how the image processor may apply stabilization to a single frame of the panoramic video. In various examples, the process flow 330 may be applied to multiple frames of the panoramic video and, in some examples, to each frame of the panoramic video, as described above with respect to FIG. 5.

According to the process flow 330, the image processor may crop a frame of the video in the Y to correct for unintended motion. Because the frame is continuous in the X dimension (or simply large in some examples) relative motion of the panoramic camera in the Y dimension may be different at different X dimension positions of the frame. Accordingly, at 332, the image processor may divide the frame into a plurality of sections across the opposite dimension. FIG. 7A is a diagram showing one example of the environment 10 with the frame 4 divided into sections 70 as described. FIG. 7B shows a flattened example of the frame 4 including sections 70. Sections 70 may divide the frame along the X dimension, as shown. Any suitable number of sections may be used and any suitable section size or sizes may be used. In some examples where the frame 4 is captured with a panoramic camera including multiple image sensors (FIG. 4), each section 70 may correspond to the portion of the frame captured by a different image sensor.

At 334, the image processor may project the unintended camera velocity vector ($v_u$) and rotation vector ($\alpha_a$) onto each section of the frame. For example, referring to FIG. 7A, velocity in the camera space z dimension ($v_{uc}$), rotation in the camera space x dimension ($\alpha_{ux}$), and rotation in the camera space y direction ($\alpha_{uy}$) may contribute to shift in the frame space Y dimension and/or warp. In some examples, projecting the unintended velocity and rotation onto each section of the frame may include finding a value for the unintended velocity vector ($v_a$) and rotation vector ($\alpha_a$) corresponding to the time when the frame was captured. In some examples, the sampling rate of the motion sensor or sensors may be different than the sampling rate of the image sensor or sensors of the panoramic camera and/or the image sensor(s) and the motion sensor s may not be synchronized. Accordingly, the image processor may select values of the velocity vector ($v_a$) and rotation vector ($\alpha_a$) that correspond to the time when the frame was captured. For example, when the sampling rate of the motion sensors is greater than the sampling rate of the image sensors, the image processor may take an average of values for the velocity vector ($v_a$) and rotation vector ($\alpha_a$) that are at our about at the time that the image sensor(s) captured the frame. In some examples, the image processor may apply a weighted average where each value for the velocity vector ($v_a$) and rotation vector ($\alpha_a$) is weighted based on its distance in time from when the frame was captured. For example, values for the velocity vector ($v_a$) and rotation vector ($\alpha_a$) captured farther in time from when the frame was captured may be weighted relatively lower than values captured closer in time to when the frame was captured. In one example, the image sensor(s) may operate with a sampling rate of 30 frames per second (fps) while the motion sensors may operate at a sampling rate of 100 Hz.

The velocity $v_{uc}$ and a component of the rotations $\alpha_{ux}$ and/or $\alpha_{uy}$ parallel to the X dimension at each section 70 may contribute to unintended translation of the frame in the Y dimension. A component of the rotations $\alpha_{ux}$ and/or $\alpha_{uy}$ that is perpendicular to the X and Y dimensions may contribute to frame warping where desired pixel values are rotated about the frame space. In some examples where each section corresponds to a portion of the frame captured by a different image sensor, projecting the unintended camera velocity and rotation vectors onto a section 70 may comprise deriving from the unintended camera velocity and rotation vectors at the image sensor that captured that section.

At 336, the image processor may crop the sections 70 based on the relative unintended translation of camera relative to the section 70. Referring to FIGS. 7A and 7B, this may involve cropping a top and/or bottom portion of each section 70. At 338, the image processor may correct for image warp at each section, for example, based on the projection from 334. In some examples, the de-warping described at 338 may be omitted. For example, in various implementations, components of the rotation and velocity of the panoramic camera that would cause rotation at the various sections 70 may be very small, allowing the image processor to ignore them.

In some examples, including the example illustrated in FIGS. 7A and 7B, sections 70 may overlap one another, resulting in overlap sections 72. The image processor may apply cropping and de-warping to the overlap sections 72 in any suitable manner. For example, the image processor may find an average between the cropping called for by each section 70 that overlaps at an overlap section 72 and apply the average cropping at the overlap section 72. Also, in some examples, the image processor may find an average de-warping called for by each section 70 that overlaps at an overlap section 27 and apply the average de-warping to the overlap section 72.

Figure 8:
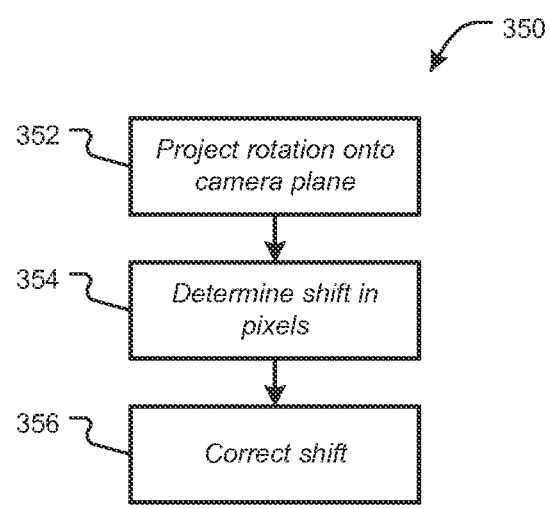
FIG. 8 is a flow chart showing one example of process flow that may be executed by the image processor to stabilize a panoramic video in a continuous dimension.

FIG. 8 is a flow chart showing one example of process flow 350 that may be executed by the image processor to stabilize a panoramic video in a continuous dimension. Like the process flow 330, the process flow 350 is described with reference to FIGS. 1A, 1B, 7A, 7B as well as FIG. 9, introduced below. In these figures, the vertical frame space dimension Y is discontinuous and the horizontal frame space direction X is continuous. In various examples, however, the process flow 350 can be used with any panoramic video that is continuous in at least a first dimension. The process flow 350 demonstrates how the image processor may apply stabilization to a single frame of the panoramic video. In various examples, the process flow 350 may be applied to multiple frames of the panoramic video and, in some examples, to each frame of the panoramic video, as described above with respect to FIG. 5.

Figure 9:
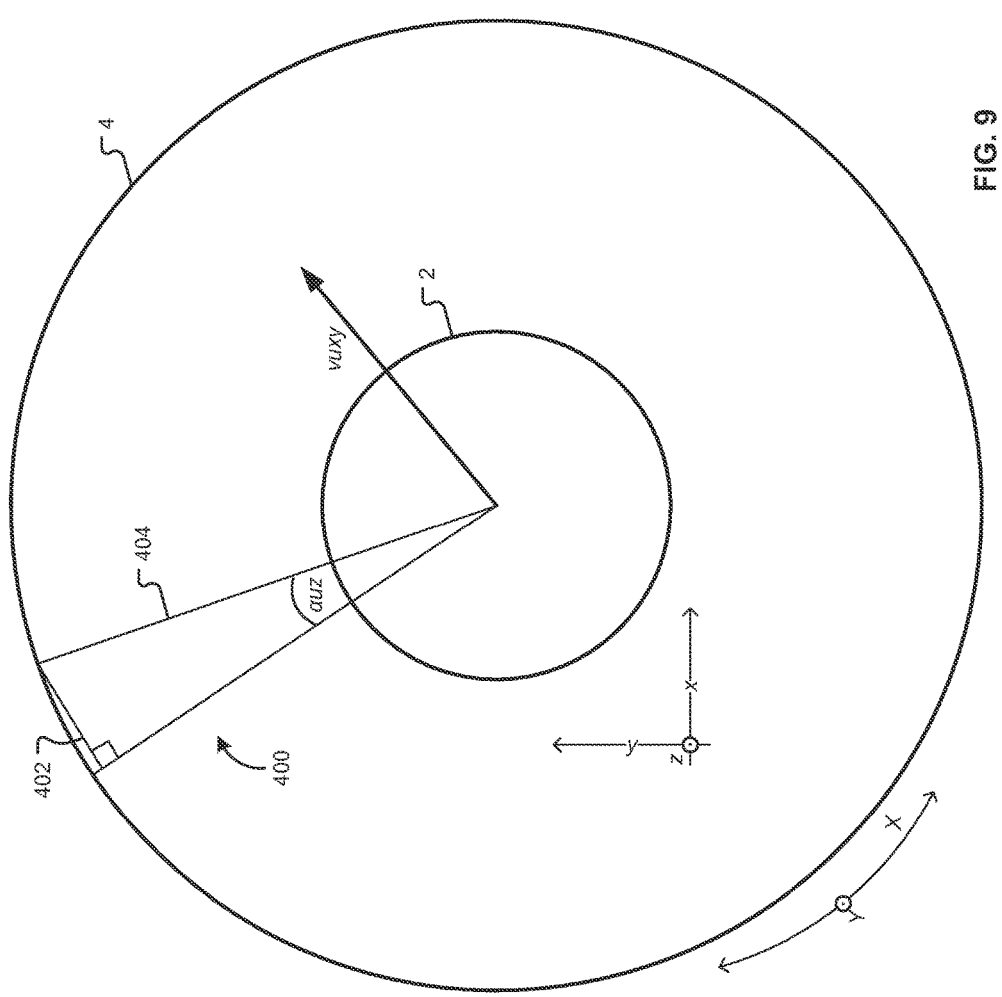
FIG. 9 is a diagram showing a view of one example of the camera and frame taken at the xy or camera plane.

At 352, the image processor may find a planar component of the unintended rotation of the camera by projecting the unintended rotation of the camera onto a camera plane. This may involve determining values of the velocity vector ($v_u$) and rotation vector ($\alpha_u$) corresponding to the time when the frame was captured, for example, as described herein. The camera plane may be a plane in which one or more image sensors of the panoramic camera are mounted. For example, the camera plane may be perpendicular to the position of the frame in the camera space. Referring to the example of FIGS. 1A and 1B, the camera plane is the xy plane of the camera space. FIG. 9 is a diagram showing a view of one example of the panoramic camera 2 and frame 4 taken at the xy or camera plane. In the example of FIGS. 1A and 1B, where the camera plane is the xy plane, the planar component of the unintended rotation may be equivalent to the rotation about the z-axis, or $\alpha_{uz}$. In some examples, the planar component of the unintended rotation may be about an axis that is perpendicular to the continuous dimension of the frame. For example, referring to FIGS. 1A and 1B, the planar component of the unintended rotation $\alpha_{uz}$ is about the z-axis in the camera space. The z-axis in the camera space is perpendicular to the continuous X axis in the frame space, as illustrated.

At 354, the image processor may determine a shift in the frame due to the unintended rotation $\alpha_{uz}$. The shift may represent the degree to which the frame is shifted along the X axis of the frame space due to the rotation $\alpha_{uz}$ of the panoramic camera 2. Frame shift may be found by projecting the rotation $\alpha_{uz}$ onto the frame and expressing the resulting shift in pixel values. For example, referring to FIG. 9, the rotation $\alpha_{uz}$ may be expressed as an angle. In some examples, the angle $\alpha_{uz}$ may be projected onto the frame 4 by assuming a right triangle 400 positioned between the center of the panoramic camera 2 and the frame 4, as illustrated in FIG. 9. A hypotenuse of the triangle 400 may be a radius 404 (Radius) between the center of the panoramic camera 2 and the frame 4. For example, the radius 404 may be a distance between the center of the panoramic camera 2 and the focal point of the image sensor or sensors of the camera, where the focal point of the image sensor or image sensors indicates an assumed position of the frame 4 in the camera space. The length of the side 402 may give the frame shift. In various examples, the actual shift may curve with the curved position of the frame 4 in the camera space. When the rotation $\alpha_{uz}$ is small, however, the side 402 may provide an acceptable approximation. The frame shift, in some examples, may be given by Equation [5] below:

$$\text{Frame Shift} = \text{Constant} \times \text{Radius} \times \sin(\alpha_{uz}) \quad [5]$$

In Equation [5], Frame Shift may be the length of the side 402. Radius may be the length of the radius 404. The Constant may be a pixel conversion constant that converts a raw value of the frame shift to a number of pixel values in the frame. For example, the Constant may have units of degrees/pixel, radians/pixel, inches/pixel, etc. In some examples, the Constant may be found during a calibration process for the panoramic camera 2. For example, the panoramic camera 2 may capture a frame of a target. It may be rotated by a known angle and then may capture a second frame of the target. The Constant may be the known angular rotation over the motion of the target, in pixel value positions, between the first and second frames. In some examples, calibrating the camera may involve taking multiple trials including multiple frames taken over multiple known rotation angles. The Constant may be found by aggregating the results of the trials. Also, although Equation [5] utilizes the sine of the rotation $\alpha_{uz}$, in examples when the rotation angle $\alpha_{uz}$ is small, the law of small angles may apply, making it possible to substitute for $\sin(\alpha_{uz})$ either $\tan(\alpha_{uz})$ or simply $\alpha_{uz}$.

Referring back to FIG. 8, at 356, the image processor may correct the frame shift of the frame 4. This may be done in any suitable manner. In some examples, the image processor may shift each frame in a panoramic video to construct a corrected panoramic video that incorporates the shifted frames. Also, in some examples, the image processor may create playback instruction data. The playback instruction data may comprise an indication of the calculated frame shift for each frame. When the panoramic video is played-back by the image processor or another device, it may shift each frame according to the frame shift indicated by the playback instruction data. The playback instruction data may be included with the panoramic video in any suitable manner. For example, in some video formats, each frame comprises associated user data. In some examples, the image processor may incorporate the playback instruction data for each frame into the user data for the frame. Also, in some examples, playback instruction data for some or all of the frames of a panoramic video may be incorporated into a stream or other data structure of a data file including the panoramic video.

Figure 10:
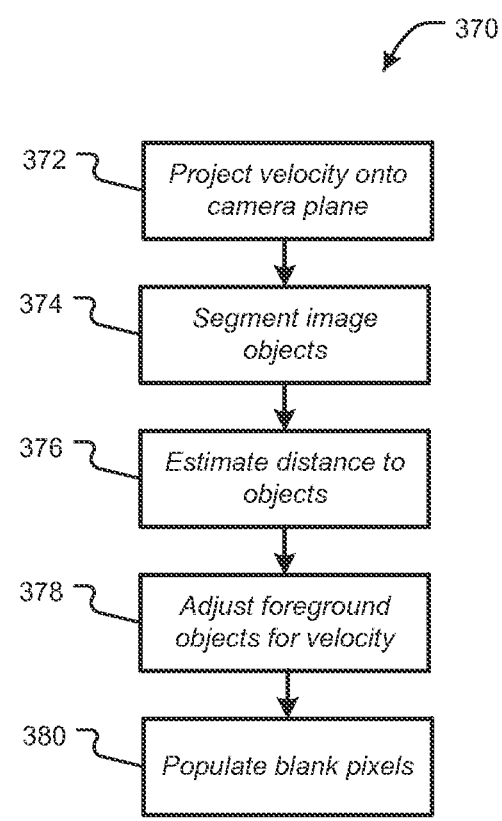
FIG. 10 is a flow chart showing one example of a process flow 370 that may be executed by the image processor to stabilize a frame for velocity in the xy or camera plane.

In some examples, the image processor may also correct for an unintended planar velocity. The unintended planar velocity may be a component of the total unintended velocity of the panoramic camera that is in the camera plane. For example, in FIGS. 1A, 1B, and 9, the camera plane is the xy plane of the camera space. Therefore, the unintended planar in the example of FIGS. 1A, 1B and 9 may be the component of the unintended velocity component ($v_{uxy}$) in the xy plane. The unintended planar velocity $v_{uxy}$ may be a vector addition of the x and y dimension components of the unintended velocity ($v_{ux}$, $v_{uy}$) of the panoramic camera 2. An example of $v_{uxy}$ is shown in FIG. 9. Also, FIG. 10 is a flow chart showing one example of a process flow 370 that may be executed by the image processor to stabilize a frame for unintended velocity in the xy or camera plane. The process flow 370 demonstrates how the image processor may apply stabilization to a single frame of the panoramic video. In various examples, the process flow 370 may be applied to multiple frames of the panoramic video and, in some examples, to each frame of the panoramic video, as described above with respect to FIG. 5.

At 372, the image processor may find the unintended planar velocity of the panoramic camera. For example, this may be $v_{uxy}$, described herein. At 374, the image processor may segment a frame into objects. In various examples, linear motion of the camera, such as the velocity $v_{uxy}$, may affect objects in the foreground more than objects in the background of the frame. For example, due to parallax, objects closer to the camera may respond to camera motion much more than objects farther away. In some examples, background objects may be considered impervious to the camera motion. For example, objects farther away from the panoramic camera 2 may not move within a frame. Any suitable method may be used to divide a frame into objects. For example, the image processor may apply an edge recognition algorithm. An object may include a set of pixel values between one or more detected edges. Some objects may include a set of pixel values between one or more detected edges and an edge of the frame (e.g., a frame edge).

Figure 11:
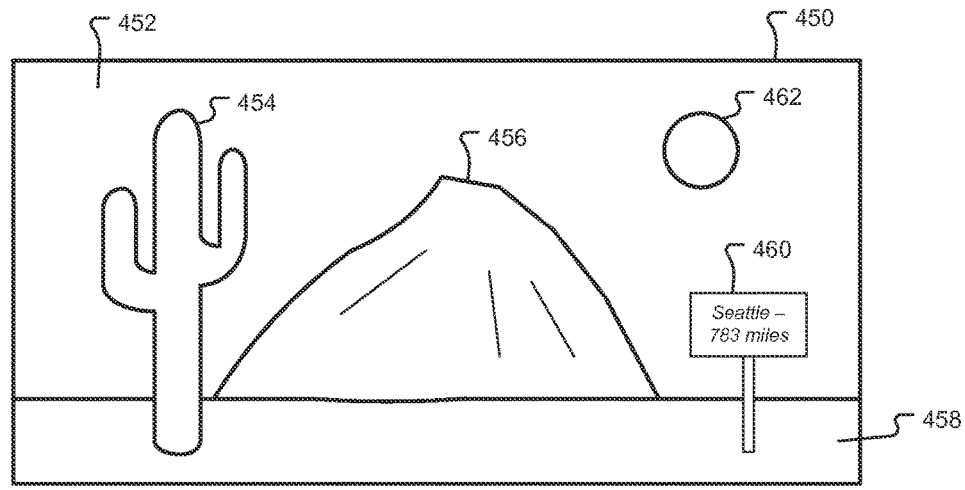
FIG. 11 is a diagram showing one example of a frame comprising a plurality of objects.
Figure 12:
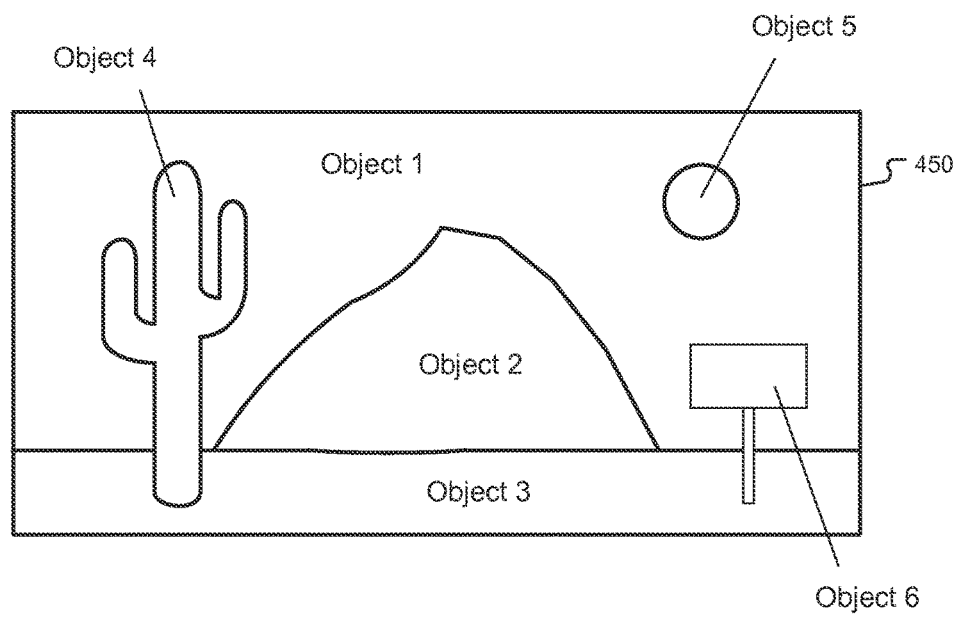
FIG. 12 shows the frame of FIG. 11 with the objects outlined.

FIG. 11 is a diagram showing one example of a frame 450 comprising a plurality of objects including, for example, sky 452, a cactus 454, a mountain 456, ground 458, a sign 460, and a sun 462. FIG. 12 shows the frame 450 with the objects outlined. For example, the sky 452 may correspond to Object 1. The cactus 454 may correspond to Object 4. The mountain 456 may correspond to Object 2. The ground 458 may correspond to Object 3. The sign 460 may correspond to the Object 6. The sun 462 may correspond to Object 5.

Figure 13:
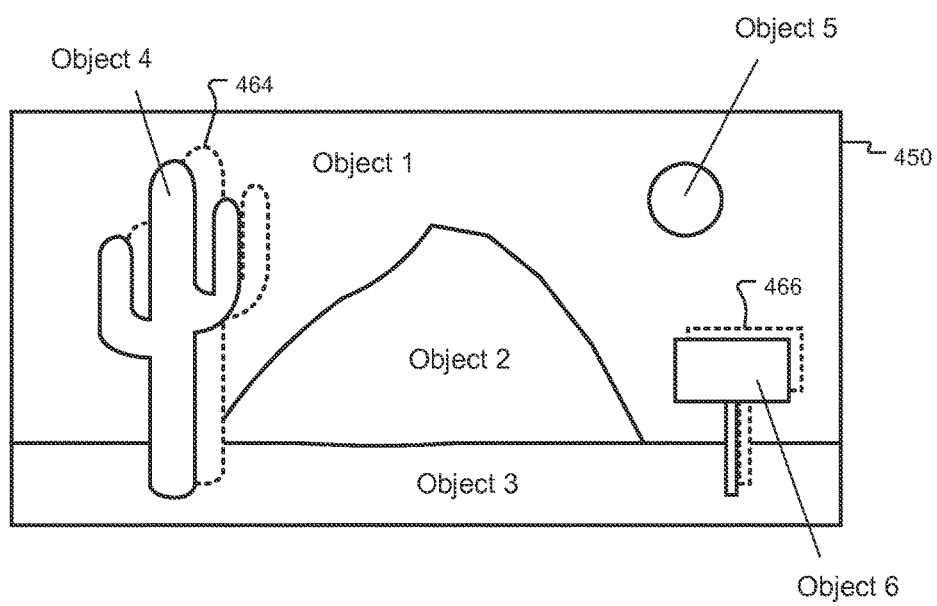
FIG. 13 shows one example of the frame after objects have been shifted

Referring back to FIG. 10, the image processor may estimate the distance to each object identified in the frame. This may be accomplished in any suitable manner. In some examples utilizing a panoramic camera having multiple sensors with overlapping fields-of-view, the image processor may receive raw images of the object from multiple sensors and utilize stereo effects to find distance. For example, an object (e.g., represented by a particular set of pixel values) may appear in frames captured by multiple image sensors. The difference in the position of the object in one frame versus another, along with the distance between the respective image sensors, may be used to determine the distance from the panoramic camera to the object. In some examples, each object may be classified as either foreground or background. In some examples, further gradations of distance may be used. At 378, the image processor may adjust foreground objects for the unintended velocity component $v_{uxy}$. Adjusting may involve, for example, shifting or re-sizing the set of pixel values making up an object within the frame to counter motion due to $v_{uxy}$. Shifting an object may include moving the set of pixel values making up the object from a first position in the frame space to a second position in the frame. For example, if some or all of the velocity $v_{uxy}$ projects across the frame, objects may be shifted in the opposite direction. Also, for example if some or all of the velocity $v_{uxy}$ projects into or out of the frame, objects may be re-sized. Re-sizing an object may include making the set of pixel values making up the object larger or smaller. Making the set of pixel values larger may include adding additional pixel values to the set. Making a set of pixel values smaller may include subtracting pixel values from the set. When pixel values are subtracted from the set, blank pixel value positions may be left in the frame (e.g., pixel value positions on the two-dimensional frame space or grid for which there is no value). Blank pixel value positions may be filled (e.g. pixel values added) in in any suitable manner including, for example, by extrapolating pixel values from adjacent background pixel value positions, looking for pixel values at equivalent pixel value positions in frames adjacent the considered frames, etc. For example, an object may be made smaller if the motion $v_{uxy}$ projects into the frame and made larger if the motion $v_{uxy}$ projects out of the frame. In some example, shifting may result in blank pixel value positions. Blank pixel value positions may be where a shifted or re-sized object used to be before being shifted or re-sized. For example, FIG. 13 shows one example of the frame 450 after Object 4 and Object 6 have been shifted. In FIG. 13, the set of pixel values making up the Object 4 and the Object 6 have been shifted downward and towards the left, leaving areas 414 and 416 of blank pixel value positions.

At 380, the image processor may populate the blank pixel value positions, such as those at areas 414, 416. The blank pixel value positions may be populated in any suitable manner. For example, the image processor may extrapolate values for the blank pixel value positions from the background objects adjacent the shifted or re-sized objects. Referring to FIG. 13, the blank pixel areas 414, 416 may be repopulated by extrapolating pixel values from nearby portions of the sky (Object 1) and the ground (Object 3). Also, in some examples, the image processor may populate blank pixel value positions by giving the blank pixel value positions values equal to the value for corresponding pixel value positions in adjacent frames (e.g., frames that come either before or after the considered frame). Corresponding pixel value positions may be positions at the same location on the pixel plane of pixels.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method for stabilizing a 360° panoramic video, the method comprising:

receiving, from a panoramic camera, video data comprising a plurality of frames, wherein the panoramic camera was positioned in a three-dimensional camera space described by an x-axis, a y-axis, and a z-axis that are mutually orthogonal, wherein receiving the video data comprises receiving first frame data of the plurality of frames that represents a 360° field-of-view of the panoramic camera, the first frame data including a plurality of pixel values and spatial arrangement data describing positions for the plurality of pixel values on a pixel plane comprising a plurality of pixel value positions, and wherein pixel values positioned at a first vertical edge of the pixel plane and at a second vertical edge of the pixel plane opposite the first vertical edge depict adjacent portions of the three-dimensional camera space;

receiving, from a gyro sensor, rotation data of the panoramic camera in the three-dimensional camera space;

high-pass filtering the rotation data of the panoramic camera to generate unintended rotation data describing unintended rotation of the panoramic camera in the three-dimensional camera space;

using the unintended rotation data, determining a planar component of the unintended rotation, wherein the planar component of the unintended rotation is about the z-axis and in an xy plane;

for the first frame data from the plurality of frames of the video data, converting the planar component of the unintended rotation to a first frame shift in a horizontal dimension of the pixel plane; and writing the first frame shift to a user data location associated with the first frame data.

2. The method of claim 1, further comprising:

receiving, from an accelerometer, velocity data indicating a velocity of the panoramic camera in the three-dimensional camera space;

high-pass filtering the velocity data to generate unintended velocity data indicating an unintended velocity of the panoramic camera;

using the unintended velocity data, determining a planar component of the unintended velocity of the panoramic camera in the xy plane;

identifying a first set of pixel values from the plurality of pixel values of the first frame data, wherein the spatial arrangement data describes a first set of pixel value positions for the first set of pixel values;

determining that a first object depicted by the first set of pixel values is a foreground object;

shifting the first set of pixel values from the first set of pixel value positions to a second set of pixel value positions to compensate for the planar component of the unintended velocity; and write to the first set of pixel value positions, a second set of pixel values from a third set of pixel value positions at second frame data immediately after the first frame data in the panoramic video, wherein the third set of pixel value positions correspond to the first set of pixel value positions.

3. The method of claim 1, further comprising:

receiving from an accelerometer a velocity of the panoramic camera in the three-dimensional camera space;

high-pass filtering the velocity of the panoramic camera to find an unintended velocity of the panoramic camera;

determining an unintended rotation of the panoramic camera about the x-axis;

determining an unintended rotation of the panoramic camera about the y-axis;

determining an unintended velocity of the panoramic camera in a direction of the z-axis;

determining into a plurality of columns across the horizontal dimension of the pixel plane of the first frame data;

projecting the unintended rotation of the panoramic camera about the x-axis, the unintended rotation of the panoramic camera about the y-axis, and the unintended velocity of the panoramic camera in the direction of the z-axis to a first column of the plurality of columns;

cropping the first column in a vertical dimension of the pixel plane to compensate for the unintended rotation of the panoramic camera about the y-axis, and the unintended velocity of the panoramic camera in the direction of the z-axis;

projecting the unintended rotation of the panoramic camera about the x-axis, the unintended rotation of the panoramic camera about the y-axis, and the unintended velocity of the panoramic camera in the direction of the z-axis to a second column of the plurality of columns; and cropping the second column in the vertical dimension to compensate for the unintended rotation of the panoramic camera about the y-axis, and the unintended velocity of the panoramic camera in the direction of the z-axis.

4. A system for stabilizing a panoramic video, the system comprising:

an image processor, the image processor comprising at least one processor and operatively associated memory, wherein the image processor is programmed to:

receive first frame data from the panoramic video, wherein the first frame data comprises a plurality of pixel values and spatial arrangement data describing positions for the plurality of pixel values on a pixel plane, and wherein the plurality of pixel values are continuous in a first dimension;

receive, from a motion sensor, data describing a rotation of at least one image sensor that captured the first frame data at a time when the at least one image sensor captured the first frame data;

high-pass filter the data describing the rotation resulting in unintended rotation data describing an unintended rotation of the at least one image sensor that captured the first frame data at the time when the at least one image sensor captured the first frame data;

determine a planar component of the unintended rotation about a first axis perpendicular to the first dimension of the pixel plane; and determine, based at least in part on the planar component of the unintended rotation, a first frame data shift in the first dimension.

5. The system of claim 4, wherein the image processor is further programmed to generate playback instruction data for the first frame data, wherein the playback instruction data comprises the first frame data shift.

6. The system of claim 4, wherein the image processor is further programmed to shift the plurality of pixel values in the first dimension by the first frame data shift.

7. The system of claim 4, wherein determining the first frame data shift comprises projecting the planar component of the unintended rotation onto the first frame.

8. The system of claim 4, wherein projecting the planar component of the unintended rotation onto the first frame data comprises:

determining an opposite side length of an opposite side of a right triangle, wherein a hypotenuse the right triangle is a radius from the at least one image sensor to the first frame, and wherein the opposite side is opposite the planar component of the unintended rotation; and applying a pixel conversion to the opposite side length to find the first frame data shift in pixel value positions.

9. The system of claim 4, wherein the image processor is further programmed to:

receive from an accelerometer data describing a velocity of the at least one image sensor at the time when the at least one image sensor captured the first frame data; and high-pass filter the data describing the velocity resulting in an unintended velocity data describing an unintended velocity of the at least one image sensor at the time when the at least one image sensor captured the first frame data.

10. The system of claim 9, wherein the image processor is further programmed to:

determine a planar component of the unintended velocity of the at least one image sensor in a plane perpendicular to the pixel plane;

identify a set of pixel values from the plurality of pixel values, wherein the spatial arrangement data describes a first set of pixel value positions for the set of pixel values and wherein the set of pixel values depicts a first object;

determine that the first object is a foreground object; and shift the set of pixel values from the first set of pixel value positions to a second set of pixel value positions to correct for the planar component of the unintended velocity.

11. The system of claim 10, wherein shifting the set of pixel values to the second set of pixel value positions comprises replacing an existing set of pixel values at the second set of pixel value positions with the first set of pixel values.

12. The system of claim 10, wherein the image processor is further programmed to: add a new pixel value to the set of pixel values to change a size of the first object, wherein the new pixel value is described at the spatial arrangement data by a pixel value position adjacent the first set of pixel value positions.

13. The system of claim 10, wherein the image processor is further programmed to: write to a first pixel value position from the first set of pixel value positions with a new pixel value.

14. The system of claim 13, wherein the image processor is further programmed to extrapolate the new pixel value from at least one adjacent pixel value of a pixel value position adjacent to the first pixel value position.

15. The system of claim 13, wherein the new pixel value is from a second pixel value position corresponding to the first pixel value position in a second frame adjacent to the first frame data in the panoramic video.

16. The system of claim 9, wherein the plurality of pixel values of the first frame data are discontinuous in a second dimension perpendicular to the first dimension, and wherein the image processor is further programmed to:

determine a second component of the unintended rotation about a second axis perpendicular to the first axis;
  determine a third component of the unintended rotation about a third axis perpendicular to the first axis and the second axis;
  determine a first component of the unintended velocity in a direction of the first axis;
  determine a plurality of columns of the first frame across the first dimension of the pixel plane;
  project the second component of the unintended rotation, the third component of the unintended rotation and the first component of the unintended velocity to a first column from the plurality of columns; and
  crop the first column to correct for the second component of the unintended rotation, the third component of the unintended rotation and the first component of the unintended velocity.

17. A system for stabilizing a panoramic video, the system comprising:

an image processor, the image processor comprising at least one processor and operatively associated memory, wherein the image processor is programmed to:
    receive a first frame from the panoramic video and captured by a panoramic camera positioned in a three-dimensional camera space described by an x-axis, a y-axis, and a z-axis that are mutually orthogonal, wherein the first frame comprises a plurality of pixel values and spatial arrangement data describing positions for the plurality of pixel values in a pixel plane, and wherein the first frame is continuous in a first dimension;
    receiving, from a gyro sensor, data describing a rotation of the panoramic camera at a time when the panoramic camera captured the first frame;
    high-pass filtering the data describing the rotation resulting in unintended rotation data describing an unintended rotation of the panoramic camera;
    determine a planar component of the unintended rotation about the z-axis; and
    determine, based at least in part on the planar component of the unintended rotation, a first frame shift in the first dimension.

18. The system of claim 17, wherein the image processor is further programmed to:

receive from an accelerometer data describing a velocity of the panoramic camera at the time when the panoramic camera captured the first frame; and
  high-pass filter the velocity resulting in unintended velocity data describing an unintended velocity of the panoramic camera at the time when the panoramic camera captured the first frame.

19. The system of claim 18, wherein the image processor is further programmed to:

determine a planar component of the unintended velocity of the panoramic camera in an xy plane of the three-dimensional camera space;
  identify a set of pixel values from the plurality of pixel values, wherein the spatial arrangement data describes a first set of pixel value positions for the set of pixel values, and wherein the set of pixel values depicts a first object;
  determine that the first object is a foreground object; and
  shift the set of pixel values from the first set of pixel value positions to a second set of pixel value positions to correct for the planar component of the unintended velocity.

20. The system of claim 18, wherein the plurality of pixel values of first frame data are discontinuous in a second dimension perpendicular to the first dimension, and wherein the image processor is further programmed to:

determine a second component of the unintended rotation about the x-axis;
  determine a third component of the unintended rotation about the y-axis;
  determine a first component of the unintended velocity in a direction of the z-axis;
  determine a plurality of columns of the first frame across the first dimension of the pixel plane;
  project the second component of the unintended rotation, the third component of the unintended rotation and the first component of the unintended velocity to a first column from the plurality of columns; and
  crop the first column to correct for the second component of the unintended rotation, the third component of the unintended rotation and the first component of the unintended velocity.

* * * * *